United States Patent Office 2,733,210
Patented Jan. 31, 1956

2,733,210
LUBRICANT COMPOSITIONS AND METHOD OF MAKING SAME

Edward Roy Taylor, Jr., Springfield, Pa., assignor to E. I. du Pont de Nemours and Company, Wilmington, Del., a corporation of Delaware No Drawing. Application February 10, 1953, Serial No. 336,207

9 Claims. (Cl. 252—49.3)

This invention relates to lubricant compositions and more particularly to corrosion-inhibited aqueous lubricant compositions adapted to minimize frictional seizure at the interfaces of rubber or rubber-like material to itself, metal or non-metal, and to the method of preparing such compositions.

The compositions of this invention are particularly designed to reduce friction at interfaces where rubber or rubber-like resilient parts are in contact with each other or in contact with a substantially rigid surface. For example, the compositions are useful for lubricating fan belts, rubber mountings for engines, shackles, gaskets, etc.

Mineral and vegetable oils, greases and soaps and foliated materials, such as graphite and molybdenum disulphide, are well known for the property of reducing friction, but the mineral and vegetable oils cause swelling and deterioration of rubber and the solid lubricants cannot be applied to relieve frictional seizure without first physically separating the parts.

Synthetic lubricants, known as hydrolubes, have replaced conventional hydrocarbon lubricants in many applications which involve lubricating rubber and rubber-like surfaces. The hydrolubes consist essentially of aqueous solutions of a freezing point depressant selected from the group consisting of glycols and glycol ethers, a water-soluble polyoxyalkylene glycol polymer and a substituted ammonium nitrite vapor phase corrosion inhibitor.

Although the described prior art compositions may be used as a rubber lubricant, the lubricating action on parts exposed to the weather is of relatively short life because the lubricant is capable of being washed away by water. Consequently, the prior art hydrolubes are best suited for use in an enclosed system or on parts protected from exposure to water.

The applicant is aware that water-insoluble monoalkyl ethers of polyoxyalkylene glycols per se, either diluted with organic solvents or emulsified in water, have been used as rubber lubricants. The water-soluble polyoxyalkylene glycol compounds have also been used as mold lubricants and anti-stick agents for rubber and rubber products. These water-soluble lubricants provide only temporary lubrication to parts exposed to the weather. Furthermore, the aqueous solution rapidly deteriorates metal containers unless properly inhibited against corrosion.

Solutions of the water-insoluble monoalkyl ethers of polyoxyalkylene glycols in organic solvents have the disadvantage that the highly volatile solvents of low flash point are hazardous and these solvents attack the decorative finish on automobiles. Solvents are expensive diluents for the lubricant as they serve no significant purpose other than as a carrier. Emulsified water-insoluble compounds offer the usual disadvantages of a two-phase system, i. e., primarily instability on freezing and thawing.

It is an object of this invention to provide an aqueous lubricant composition which overcomes the disadvantages of the prior art lubricants. Another object is to provide an aqueous lubricant composition which, on evaporation of volatile aqueous diluent, deposits a film of non-corrosive, water-insoluble lubricant. Still another object is to provide a corrosion inhibited, aqueous lubricant composition which may be stored in a metal container. A further object is to provide an aqueous homogeneous single liquid phase lubricant composition which is package stable and withstands freezing and thawing. Another object is to provide a durable lubricant which is innocuous to rubber and rubber-like materials. A still further object is the provision of a single phase aqueous alcoholic lubricant composition which has essentially no harmful effects on metal finishes should it come in contact with them.

For the accomplishment of these and other objects hereafter disclosed, aqueous oleaginous lubricant compositions are prepared consisting essentially of water-insoluble monohydroxy 1,2-polyoxypropylene monoalkyl ethers, water miscible aliphatic monohydric alcohol, water, and a fractional percentage of a dibasic borate salt of a volatile aliphatic oxygenated monoamine as a corrosion inhibitor, said amine having a vapor pressure of at least 0.3 mm. Hg at 20° C. and being selected from the group consisting of amines having the empirical formulae

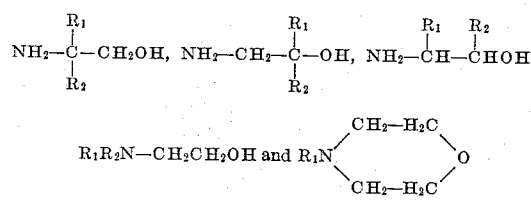

where $R_1$ and $R_2$ represent radicals of the group consisting of H—, $CH_3$—, $C_2H_5$— and —$CH(CH_3)_2$.

The following examples describe specific embodiments typifying preferred lubricant compositions of this invention. All indicated percentages and parts are expressed on a weight basis.

Example I

| | Percent by weight |
|---|---|
| Water-insoluble monohydroxy 1,2-polyoxypropylene monobutyl ether lubricant | 12.25 |
| Isopropyl alcohol | 41.50 |
| Water | 45.70 |
| Dibasic borate salt of 2 amino 2 methyl propanol-1 | .39 |
| Boric acid—99.5% purity | .16 |
| | 100.00 |

The lubricant in the above example was the commercially available Ucon LB–525 and was a mixture of ethers having an average of at least nine oxy 1,2-propylene groups per molecule. The lubricant had a viscosity of about 525 Saybolt Universal seconds at 38° C. and a specific gravity of 0.999 at 20/20° C.

The dibasic borate salt was formed in situ by the addition of 0.23 part of the amine and 0.16 part boric acid. The specified content of boric acid is in addition to that required for the salt formation and in this instance is 100% in excess. The dibasic borate salt furnishes alkalinity to the aqueous lubricant composition for the purpose of inhibiting corrosion. The excess boric acid neutralizes the alkalinity to the desired pH value. The pH of the described lubricant was about 9.65.

Although any convenient order of mixing may be used in preparing the aqueous lubricant compositions of this invention, solution of the salt-forming constituents may be hastened by initially dissolving them in water and adding the alcohol and polymer to the aqueous salt solution. Consequently, this method of preparation is preferred.

The lubricant packaged in a metal container having a coating designated as 0.50 electrolytic tin plate (.5 lb. tin on both sides of 218 sq. ft.) showed no rusting in either the liquid phase or vapor phase during storage after 6 months at either room temperature or at 120° F. The product was stable at sub-zero temperatures, forming a slush at about −4° F. and freezing at about −12° F. Thawing after freezing restored the lubricant to its original homogeneous single phase liquid state. Several freeze-thaw cycles were found to have no deleterious effect on the product. Heating of the lubricant composition to a temperature above about 143° F. caused the polymer to separate from the diluent as indicated by the cloudy appearance. Homogeneity was restored by cooling to a temperature below the indicated cloud point. Volatile loss of alcohol to a point where the isopropyl alcohol was less than about 45 parts of isopropyl alcohol to 55 parts of water altered the homogeneity of the liquid lubricant composition. When the isopropyl alcohol content was increased to 45 parts and higher to 55 parts of water, the homogeneity of the lubricant composition was restored.

In use, the composition of Example I provided an excellent lubricant for rubber in contact with another rubber surface or metallic or non-metallic surfaces. The lubricant showed no deleterious effect on natural rubber and synthetic rubbers, nor did it exhibit any corrosive attack on metals. The lubricant composition readily penetrated between the contacted surfaces to deposit a film of water-insoluble lubricant which reduced friction and thereby eliminated objectionable noises resulting from surfaces moving in frictional contact. A prolonged spray of water did not wash away the lubricant.

*Example II*

| | Percent by weight |
|---|---|
| Water-insoluble lubricant (same as in Example I) | 7.00 |
| Isopropyl alcohol | 47.00 |
| Water | 45.45 |
| 2 amino 2 methyl propanol-1 | .23 |
| Boric acid | .32 |
| | 100.00 |

The indicated content of boric acid was sufficient to form 0.39 part of dibasic borate salt, leaving an excess of 0.16 part.

Two discs of rubber 1½ inches in diameter were wetted dropwise on one side with the above lubricant composition. The volatile constituents were allowed to vaporize, leaving a film of water-insoluble lubricant. The lubricated surfaces were placed face to face and a 2 kilogram weight was applied. Under this load, the upper rubber disc could be twisted or turned without apparent frictional seizure.

*Example III*

The following example represents the use of the borate salt of monoethanol amine as the corrosion inhibitor.

| | Percent by weight |
|---|---|
| Water-insoluble lubricant (same as in Example I) | 12.32 |
| Isopropyl alcohol | 42.20 |
| Water | 45.00 |
| Dibasic borate salt of monoethanol amine | .32 |
| Boric acid | .16 |
| | 100.00 |

To form the dibasic borate salt of monoethanol amine 0.16 part of monoethanol amine was reacted with 0.16 part of boric acid to form the dibasic borate salt. The lubricating properties of this representative product were equivalent to those of the product of Example I and it was equally as corrosion resistant.

*Example IV*

| | Percent by weight |
|---|---|
| Water-insoluble monohydroxy 1,2-polyoxypropylene monobutyl ether lubricant | 20.00 |
| Ethyl alcohol | 50.00 |
| Water | 29.40 |
| Dibasic borate salt of morpholine | .60 |
| | 100.00 |

The lubricant in the above example differed from that in Examples I, II and III in that it had a viscosity of 165 Saybolt Universal seconds at 38° C. and a specific gravity of 0.983 at 20/20° C. It is commercially available as Ucon LB-165.

The indicated content of borate salt was the reaction product of .35 part of morpholine and .25 part of boric acid. The ethyl alcohol was 95% alcohol by volume, known as denatured alcohol No. 23A.

The product was a satisfactory lubricant and the anti-corrosion properties were commercially acceptable.

In place of the monobutyl ethers in the above examples, it is to be understood that other water-insoluble monoalkyl ethers of 1,2-polyoxypropylene glycol may be used, such as, e. g., the methyl, ethyl, propyl, amyl, hexyl and other monoethers thereof derived from monohydric aliphatic alcohols having up to 20 carbon atoms as well as mixtures thereof, wherein the 1,2-polyoxypropylene glycol has an average of at least nine oxy 1,2-propylene groups per molecule. These water-insoluble lubricants may be prepared in accordance with the teaching in U. S. Patent 2,448,664.

In comparison, a composition identical with Example I but with the boric acid and borate salt of 2 amino 2 methyl propanol-1 omitted showed initiation of rusting within 24 hours and significant rusting within 4 days. The addition of as little as 0.10 part of dibasic borate salt of 2 amino 2 methyl propanol-1 and 0.05 part of boric acid per 100 parts of lubricant composition resulted in an improvement in corrosion resistance. Only a trace of rusting occurred in the tin-plated package at the liquid-vapor interface at four days. Rusting was significant at two months. At 0.20 and 0.10 part respectively of salt and boric acid, significant rusting was evident in three months. At the concentration indicated in Example I, there was no evidence of corrosion in either the liquid phase or vapor phase at three months. Doubling the inhibitor content of Example I to 0.78 part of dibasic borate salt of 2 amino 2 methyl propanol-1 and 0.32 part of boric acid per 100 parts of lubricant composition resulted in excellent resistance to rusting, but the concentration of the said amine in the vapor phase at 120° F. was sufficient to cause significant etching of the container wall in contact with the vapor phase during two months' storage. The preferred concentration of dibasic borate salt is in the range of about 0.32 to 0.60 part per 100 parts of lubricant composition and the useful range is 0.10 to 0.80 part per 100 parts of total composition. The preferred content of free boric acid is correspondingly about 0.7 part for each part of amine, i. e., in the range of about 0.10 to 0.40 part per 100 parts of lubricant composition. However, the free boric acid may be omitted entirely. The free boric acid is used to neutralize the alkalinity of the dibasic borate salt in the lubricant and to adjust the pH value. The pH value may vary between 8.0 and 10.0.

The dibasic borate salt of 2 amino 2 methyl propanol-1 is the preferred corrosion inhibitor for the aqueous lubricant compositions of this invention, but diborate salts of other volatile aliphatic hydroxy monoamines and alkyl substituted derivatives thereof also are suitable corrosion inhibitors. Amines suitable for the formation of dibasic borate salts to serve as a corrosion inhibitor in the practice of this invention are those having a vapor pressure of at least 0.3 mm. Hg at 20° C., and a molecular weight not greater than 118. Examples of these volatile amines are monoethanol amine, 2 amino 2 methyl propanol-1, morpholine, N-methyl morpholine, N-ethyl morpholine, isopropyl amino ethanol, N-methyl ethanol amine, N-dimethyl ethanol amine, N-ethyl ethanol amine, N-diethyl ethanol amine and isopropanol amine.

In addition to the preferred isopropyl alcohol and ethyl alcohol shown in the examples as water-miscible solvents for the water-insoluble lubricants the aqueous-alcoholic composition, other water-soluble, aliphatic, monohydric alcohols may be used. Examples of such solvents are methyl alcohol, propyl alcohol, tertiary butyl alcohol and methoxy ethanol. Of these several disclosed alcohols, isopropyl alcohol is particularly preferred. Aqueous solutions having a major proportion of methyl alcohol, ethyl alcohol or methoxy ethanol will generally attack coatings used to finish vehicles and machines and consequently greater precaution must be exercised that the lubricant composition does not remain in contact with the finish. Aqueous isopropyl alcohol is less harmful toward the finish than the aforementioned alcohols. Less hazard is involved in its use as it is non-toxic and its flash point is higher than that of either methyl or ethyl alcohol.

In order to maintain a singe phase the ratio of water-miscible monohydric alcohol to water in the compositions of this invention should not be less than about 45 parts of alcohol to 55 parts of water. In order to prevent the lubricant from having harmful effects on decorative finishes the ratio of the alcohol to water should not be more than about 70 parts of alcohol to 30 parts of water. For uses where decorative finishes are not involved higher ratios of alcohol to water may be employed.

Tests with compositions containing lower amounts of the water-insoluble monohydroxy 1,2-polyoxypropylene monalkyl ethers indicated that about 5% is the minimum operative content to substantially reduce frictional seizure. Application properties control the operative upper limit of the content of the lubricant. The high viscosity of these lubricants prevents application by spray without dilution. Application of undiluted lubricant to rubber mountings, shackles, and other exposed surfaces subject to frictional seizure is wasteful and uneconomical. A practical upper limit for the content of the water-insoluble monohydroxy 1,2-polyoxypropylene monoalkyl ether in the aqueous-alcoholic lubricant composition is about 30% based on the total composition. For the purposes of this invention 10 to 20%, based on the total composition, is the preferred content.

Water-insoluble monohydroxy 1,2-polyoxypropylene monoalkyl ethers having a viscosity of 525 and 165 Saybolt Universal seconds are specified in the examples, but lower viscosity polymers, such as 150 Saybolt Universal seconds viscosity material and higher viscosity grades, such as 1800 Saybolt Universal seconds material, and mixtures of two or more grades may be directly substituted.

The single phase aqueous lubricant compositions of this invention containing dibasic borate salts of volatile aliphatic oxygenated monoamines are package-stable, freeze-thaw resistant and corrosion-inhibited products. They are economical formulations which overcome the disadvantages of prior art organic solutions and emulsions of water-insoluble monohydroxy 1,2-polyoxypropylene monoalkyl ether lubricants and water solutions of water-soluble polyoxyalkylene glycol polymer lubricants. In addition to decreasing the safety hazards involved in handling the lubricant, substitution of water for active solvent lowers the cost.

Different embodiments of this invention may be made without departing from the spirit and scope thereof and it is to be understood that the invention is not limited to the specific embodiments disclosed except as defined in the appended claims.

I claim:

1. A homogeneous single phase liquid lubricant composition consisting essentially of (1) an aqueous solution of a 1-4 carbon aliphatic monohydric alcohol in which the ratio of alcohol to water is between about 45:55 and about 70:30, (2) 5.0 to 30.0%, based on total weight, of a water-insoluble monohydroxy 1,2-polyoxypropylene monoalkyl ether having an average of at least nine oxy 1,2-propylene groups per molecule and up to 20 carbon atoms in the alkyl group, and (3) 0.1% to 0.80%, based on total weight, of a dibasic borate salt of an oxygen containing amine selected from the group consisting of monoethanol amine, 2 amino 2 methyl propanol-1, morpholine, N-methyl morpholine, N-ethyl morpholine, isopropyl amino ethanol, N-methyl ethanol amine, N-dimethyl ethanol amine, N-ethyl ethanol amine, N-diethyl ethanol amine and isopropanol amine.

2. The composition of claim 1 which contains 0.10 to 0.40 part of boric acid per 100 parts of lubricant composition in addition to the named components and the pH is within the range of 8.0 to 10.0.

3. The composition of claim 1 in which the monohydroxy 1,2-polyoxypropylene monoalkyl ether is the butyl ether.

4. The composition of claim 1 in which the dibasic borate salt is the salt of 2 amino 2 methyl propanol-1 and boric acid.

5. The composition of claim 1 in which the dibasic borate salt is the salt of monoethanol amine and boric acid.

6. The composition of claim 1 in which the dibasic borate salt is the salt of morpholine and boric acid.

7. The composition of claim 1 in which the aliphatic monohydric alcohol is isopropyl alcohol.

8. The composition of claim 1 in which the aliphatic monohydric alcohol is ethyl alcohol.

9. A homogeneous single phase liquid lubricant composition consisting essentially of (1) an aqueous solution of a 1-4 carbon atom aliphatic monohydric alcohol in which the ratio of alcohol to water is between about 45:55 and about 70:30, (2) 5.0 to 30.0% of a water-insoluble monohydroxy 1,2-polyoxypropylene monoalkyl ether having an average of at least nine oxy 1,2-propylene groups per molecule and up to 20 carbon atoms in the alkyl group, and (3) 0.1 to 0.8% of a diborate salt of an amine selected from the group consisting of monoamines having the empirical formulae

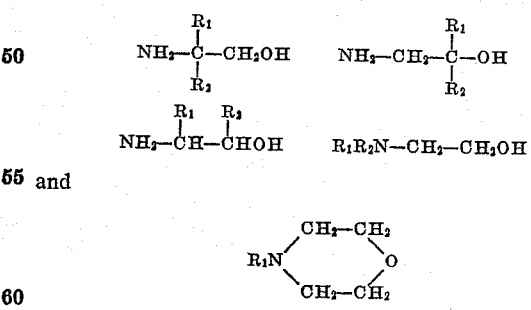

where $R_1$ and $R_2$ represent radicals of the group consisting of H—, $CH_3$—, $C_2H_5$— and —$CH(CH_3)_2$.

References Cited in the file of this patent

UNITED STATES PATENTS

| | | |
|---|---|---|
| 2,340,035 | Zimmer et al. | Jan. 25, 1944 |
| 2,566,925 | Burghart | Sept. 4, 1951 |

OTHER REFERENCES

"Ucon"—Fluids and Lubricants—publication of Carbide and Carbon Chemicals Co., N. Y.; May 31, 1948; page 13.